COMPONENTS FOR USE IN AUTOMATIC MACHINERY

Filed Nov. 17, 1955

INVENTOR.
STANTON L. YARBROUGH
BY
Carl H. Synnestvedt
AGENT 2,836,693

COMPONENTS FOR USE IN AUTOMATIC MACHINERY

Stanton L. Yarbrough, Glenside, Pa., assignor to Philco Corporation, Philadelphia, Pa., a corporation of Pennsylvania Application November 17, 1955, Serial No. 547,384

5 Claims. (Cl. 201—63)

The invention hereinafter described and claimed has to do with the field known as "automation" and, more particularly, it relates to components for use in automatic machinery.

The object of the invention is to provide a novel chain of components so linked as to facilitate their feeding into automatic insertion machinery.

While the invention is of broader applicability, it is particularly useful in connection with resistors, capacitors and inductors of the type including a body portion and a pair of oppositely extending wire leads.

In accordance with the invention and first briefly described, the chain may comprise, for example, a plurality of resistors aligned in parallelism and preferably in slightly spaced relation. End portions of the lead wires extending from each resistor are turned and attached to the leads of an adjacent resistor in a manner linking the resistors together in a continuous chain. Preferably the connections are of a type permitting relative pivotal movement of adjacent resistors, although, if desired, the connections may be rigid.

The invention may be clearly understood from the following detailed description with reference to the accompanying drawing, wherein.

Since the invention is particularly useful in connection with the manufacture of printed wiring panels, wherein various types of components are mounted on one side of a panel with leads extending through the panel and into contact with wiring on the opposite side, the following detailed description and the accompanying drawing have to do with such use of the invention.

Figure 5:
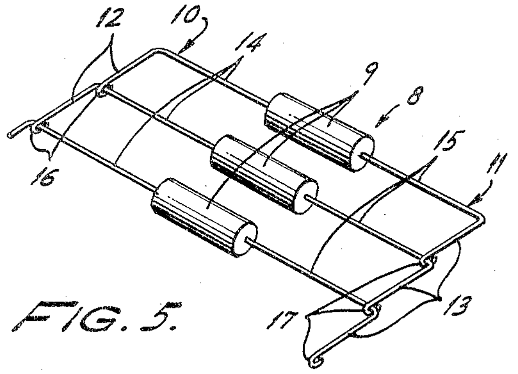
Figure 5 is a perspective view of a portion of a resistor chain constructed in accordance with the invention.

First with reference to Figure 5, it is seen that a component chain 8, formed in accordance with the invention, comprises a plurality of components, in this case, resistors, each of which includes a body portion 9 and oppositely extending wire leads 10 and 11. Outer portions 12 and 13 of the leads are turned in a direction substantially normal to inner portions 14 and 15 and have their extremities 16 and 17 looped around portions 14 and 15 of adjacent resistor leads 10 and 11, and in a manner preferably permitting relative pivotal movement of the resistors. In this manner an endless chain of resistors may be formed, however for practical reasons it is usually desirable to link enough of them to fill a spool, such as indicated at 18 in Figure 1, leaving a free end for feeding purposes. Figures 1 through 4 diagrammatically illustrate the use and advantages of such a chain in the automatic insertion of components in a printed wiring panel.

Figure 1:
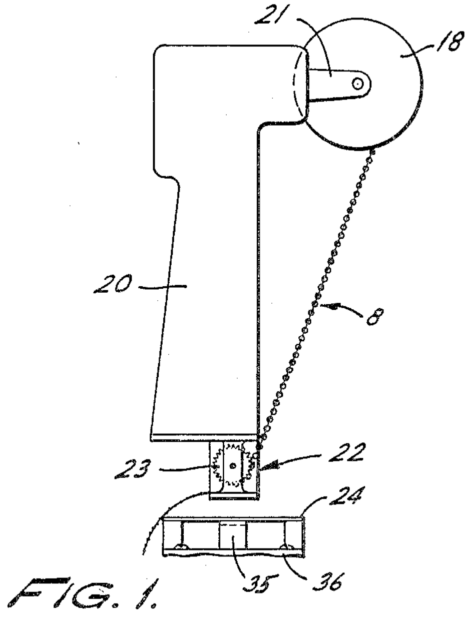
Figure 1 is an elevational view of a portion of a machine used in the automatic manufacture of so-called "printed" wiring panels.

Figure 1 shows an insertion head 20 upon which is carried the reel of resistors 18—as by bracket 21—and the insertion mechanism 22. The latter is of known type and includes a sprocket 23 having teeth so spaced as to engage lead portions 14 and 15 of the resistor chain, to move successive resistors into position for insertion in panels 24.

Figure 2:
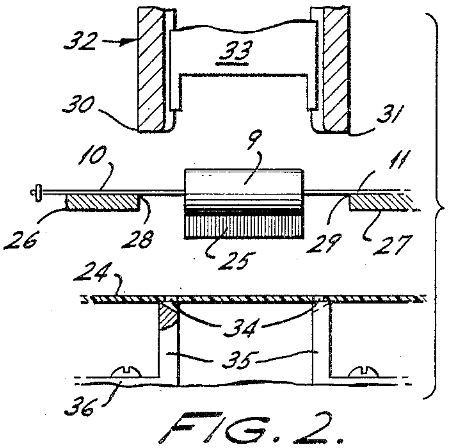
Figures 2, 3 and 4 are fragmentary sectional views showing the operational sequence of insertion mechanism forming a part of the machine shown in Figure 1.

Now with reference to Figures 2, 3 and 4, it will be seen that individual linked resistors passing from the reel toward the panel are severed from the chain and inserted in the panel in the following described manner. Referring first to Figure 2, one of the resistors is shown supported upon a movable platform 25 in position for insertion into the subjacent panel 24. Leads 10 and 11 of the resistor extend over and rest upon fixed tables 26 and 27, the inner edges 28 and 29 of which comprise blades of a shear, the other blades being formed by outer edges 30 and 31 of the ram 32 which also carries a stripper, or pusher element 33. It will be seen from this figure that panel 24 is provided with apertures 34 aligned over anvils 35, carried by fixed structure 36, and that the regions of resistor linkage are disposed "outboard" of the insertion machinery to prevent interference.

Figure 3:
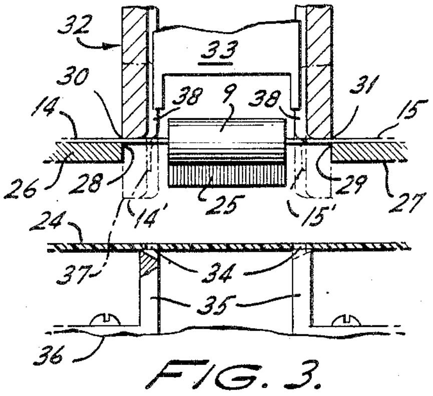

In operation of the apparatus just described, ram 32 and pusher 33 move downwardly to the position shown in solid lines in Figure 3, where pusher 33 stops while ram 32 continues its downward movement until it reaches the broken-line position indicated by numeral 37, and in so doing severs the resistor from the chain by shearing lead portions 14 and 15. Because the resistor body 9 is held stationary by platform 25, movement of the ram to the broken-line position bends leads 14 and 15 downwardly, as indicated at 14' and 15' and between the walls of grooves 38 formed in the inner walls of the ram. The resistor is retained in the grooves by the pressure of the leads against the walls of the grooves. It will be noted that the downturned portions of the leads are aligned with apertures 34 in panel 24.

Figure 4:
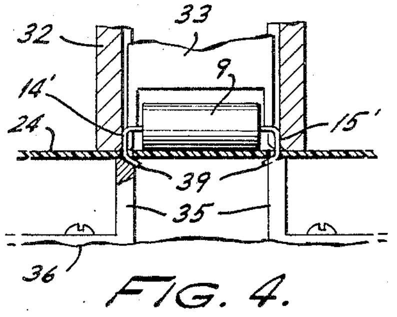

From the broken-line position 37, shown in Figure 3, ram 32, pusher 33 and resistor 9 move downwardly—table 25 being moved out of the path of movement at this point—until the ram engages the top surface of panel 24, as seen in Figure 4. Downward movement of the ram stops here, but pusher 33 continues to move, and in so doing pushes the wire leads 14' and 15' through apertures 34 and against anvils 35, bending the leads under the panel, as indicated at 39, thus securing the resistor to the panel. The ram is then withdrawn to the position shown in Figure 2 and the panel is removed. Sprocket 23 now is caused—by apparatus not shown—to move another resistor beneath the ram for insertion in another panel.

It will be noted that components linked in accordance with this invention lend themselves very well to use in automatic insertion machinery, of which the kind shown and described can be considered to be exemplary. Maintenance of proper alignment of the components, as they are fed toward and into the insertion machine, has frequently been a troublesome problem in this art, and attempts have been made to meet this problem by laboriously pre-aligning the components and applying them to gummed tapes, or the like, in an effort to produce a component linkage which will minimize feeding problems. The simple manner in which proper alignment and feeding of components can be insured, by linking the leads as taught by this invention, is in sharp contrast to the more complicated approaches which have been used heretofore. Experience has shown that problems due to misalignment of the components as they advance toward the insertion machine are virtually eliminated when resort is had to components linked in the novel manner contemplated by this invention.

Figure 6:
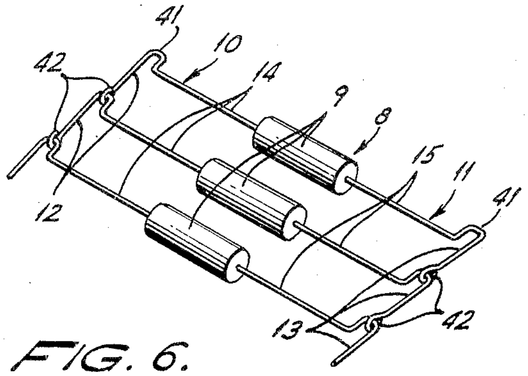
Figure 6 is a view similar to Figure 5, but showing a modified form of the invention.

Having described the preferred embodiment of the invention and the manner in which it facilitates the assembly of resistors on printed wiring panels, it will be evident that various modifications, falling within the broader scope of the invention, are available. Figure 6 shows one such modification wherein the oppositely extending portions 14 and 15 of leads 10 and 11 are bent into a crook shape, as indicated at 41, with the terminal ends of adjacent leads engaging the crook portion, as indicated at 42. It has been found that this modified construction affords a very rigid construction, yet permits considerable pivotal movement of the resistors. While both Figures 5 and 6 show the end portions 12 and 13 of oppositely extending lead wires 10 and 11 bent in the same direction, it should be understood that either could be bent in the opposite direction to engage a similarly bent lead on the adjacent resistor.

I claim:

1. An articulated chain of electrical components, comprising a plurality of components each having at least two individual wire leads extending therefrom, said components being arranged in alignment, with said leads pivotally engaging corresponding individual leads of an adjacent component.

2. An articulated chain of electrical components, comprising a plurality of parallel aligned resistor bodies, each having at least two individual wire leads extending therefrom, said leads pivotally engaging corresponding individual leads of adjacent resistors.

3. An articulated chain of components, comprising a plurality of components arranged in generally parallel alignment, each of said components including a body portion, and oppositely extending individual wire connectors, each of said connectors comprising inner and outer portions, each of said outer portions being turned in a direction substantially normal to said inner portions and having its terminal end pivotally joined to a corresponding individual connector of an adjacent component.

4. An articulated chain of components, comprising a plurality of components arranged in generally parallel alignment, each of said components having oppositely extending individual connector wires including inner and outer portions, each of said outer portions being bent in a generally crook shape and extending in a direction substantially normal to said inner portion and having its terminal end pivotally engaging the individual crook portion of an adjacent component.

5. An articulated chain of electrical components which includes adjacent components each having wire leads extending therefrom disposed in mutual pivotal interengagement.

References Cited in the file of this patent

UNITED STATES PATENTS

| | | |
|---|---|---|
| 1,871,521 | Hodell | Aug. 16, 1932 |
| 2,253,577 | Pearson et al. | Aug. 26, 1941 |

FOREIGN PATENTS

| | | |
|---|---|---|
| 580,317 | Great Britain | Sept. 3, 1946 |
| 1,060,447 | France | Nov. 18, 1953 |